United States Patent [19]

Gillis

[11] 4,349,704

[45] Sep. 14, 1982

[54] DIGITAL MULTIFREQUENCY SIGNAL GENERATOR

[75] Inventor: Philip W. Gillis, Brooklyn, N.Y.

[73] Assignee: Bell Telephone Laboratories, Incorporated, Murray Hill, N.J.

[21] Appl. No.: 108,849

[22] Filed: Dec. 31, 1979

[51] Int. Cl.³ .......................................... H04M 1/50
[52] U.S. Cl. ................................ 179/84 VF; 328/27
[58] Field of Search .................. 179/84 VF; 370/110; 328/14, 27; 364/721

[56] References Cited

U.S. PATENT DOCUMENTS

| | | | |
|---|---|---|---|
| 3,959,604 | 5/1976 | Newsom et al. | 179/84 VF |
| 4,017,693 | 4/1977 | Roche et al. | 179/84 VF |
| 4,171,466 | 10/1979 | Carbrey | 370/110 |
| 4,227,248 | 10/1980 | Munter | 370/110 |

Primary Examiner—Joseph A. Popek
Attorney, Agent, or Firm—Thomas Stafford; David R. Padnes

[57] ABSTRACT

Multifrequency (FIGS. 2 and 4) signals are generated by employing a microcomputer system (500) in conjunction with a digital-to-analog converter (506) and filter (507). Digital representations of amplitude values of the signals to be generated are stored in a read only memory (ROM 503) and sampled at a predetermined rate under control of a central processor unit (CPU 502) to generate digital signals representative of the desired multifrequency signal. The sampling rate is selected to be less than the theoretical Nyquist rate for the highest frequency tone in the multifrequency signal to turn to account the resulting so-called "alias" signals for generating tones closely spaced in frequency. In a specific example, the sampling rate is equal to twice the average frequency of the tones in the desired multifrequency signal. Unwanted harmonic components ($3\omega_0$, etc.) in the resulting multifrequency signal are minimized by employing a sampling interval which is in a predetermined relationship to the average frequency of the tones in the desired multifrequency signal. In a specific example, the sampling interval is equal to the reciprocal of three times the average frequency of the multifrequency signal.

7 Claims, 7 Drawing Figures

DIGITAL MULTIFREQUENCY SIGNAL GENERATOR

TECHNICAL FIELD

This invention relates to signal generators and, more particularly, to generators of multifrequency signals.

BACKGROUND OF THE INVENTION

It is known that in systems employing computers or the like, it is economic to have the computer perform as many tasks as possible. These tasks may include generation of signals employed in telephone signaling, for example, multifrequency signals including ringback and the like.

Multifrequency signals have heretofore been generated by employing a plurality of digital signal generators and associated complex filters to obtain desired analog signals.

More recently, similar multifrequency signals have been generated by storing digital samples representing amplitude values of desired tones of the multifrequency signal and sampling those samples at a frequency greater than the theoretical Nyquist rate (at least twice the frequency of the highest frequency tone in the multifrequency signal) in order to obtain a desirable multifrequency signal. One example of an arrangement which employs a plurality of read only memories (ROMs) for storing signal samples to generate a multifrequency signal is disclosed in U.S. Pat. No. 4,171,466 issued to Robert L. Carbrey on Oct. 16, 1979.

Similarly, multifrequency signals have been generated by appropriately programming a so-called microcomputer system. Specifically, the microcomputer is programmed to switch a plurality of internal timers on and off at intervals corresponding to square wave signals. The square waves are combined and filtered to obtain a desired analog multifrequency signal.

Computers have also been employed to generate digital signals at predetermined frequencies by sampling stored digital representations of amplitude values of the desired signals at a sampling rate significantly higher than the Nyquist rate. Use of a "high" sampling rate eliminates so-called "alias" signals from being at frequencies which would be difficult to filter.

All of the prior known multifrequency signal generators have limitations.

Specifically, use of a plurality of generators, digital or otherwise, is undesirable from cost and size considerations. When using digital signal generators, a relatively complex filter is required to eliminate undesirable harmonic frequency components, especially the third harmonic.

Use of a plurality of read only memories and associated circuit arrangements to generate a multifrequency signal as disclosed in U.S. Pat. No. 4,171,466 is also undesirable in certain applications because of the number of circuit components involved. Additionally, it also appears that the sampling rate employed is above the Nyquist rate. Moreover, each sample must be sampled a plurality of times. Although satisfactory for certain applications, this would be undesirable for others because of the additional time required, especially when the number of tasks to be performed limits the time available for generating the multifrequency signal.

When using a computer to generate a number of square waves corresponding to the number of tones in a multifrequency signal, a complex filter is required to obtain a so-called "clean" signal. More importantly, as the frequencies of the tones become closer, the switching speed of the computer must be faster. Consequently, for signals having tones at closely spaced frequencies, a high quality, high speed and, hence, more expensive computer is required. This imposes a severe economic burden on many systems.

Similarly, use of a computer to generate desired signals by sampling stored digital representations of amplitude values using as high a sampling rate as possible to eliminate harmonics requires a large number of samples to be stored and also requires a high speed computer. The additional memory required to store the samples and use of a high speed computer are not economically justifiable in many applications.

SUMMARY OF THE INVENTION

Limitations and other problems of prior known multifrequency signal generators are overcome, in accordance with an aspect of the invention, in an arrangement for generating a multifrequency signal having a plurality of tones at predetermined frequencies by sampling digital representations of amplitude values of at least one of the tones at a sampling rate which is less than the theoretical Nyquist rate corresponding to the highest frequency tone in the multifrequency signal.

In accordance with another aspect of the invention, the sampling rate is selected in predetermined relationship to the average frequency of the tones in the multifrequency signal.

In accordance with still another aspect of the invention, the interval each sample is outputted is selected so that predetermined harmonic frequency components are substantially minimized in the resulting signal. Specifically, the sampling interval is selected in predetermined relationship to the average frequency of the tones in the multifrequency signal being generated.

In accordance with a further aspect of the invention, in an arrangement for generating a multifrequency signal having an even number of tones, digital representations of amplitude values of at least the tone or tones having frequencies either higher than or lower than the average frequency of all the tones must be sampled at the predetermined rate less than the Nyquist rate for the highest frequency tone in the multifrequency signal. That is to say, the samples are either of the tone or tones having frequencies greater than or of the tone or tones having frequencies lower than the average frequency.

Similarly, in an arrangement for generating a multifrequency signal having an odd number of tones, digital representations of amplitude values of the tone at the average frequency and at least of the tone or tones having frequencies either greater than or less than the average frequency of all the tones must be sampled at the predetermined rate less than the Nyquist rate for the highest frequency tone in the multifrequency signal.

BRIEF DESCRIPTION OF THE DRAWING

The invention will be more fully understood from the following detailed description of an illustrative embodiment thereof taken in connection with the appended figures in which.

DETAILED DESCRIPTION

Figure 1:
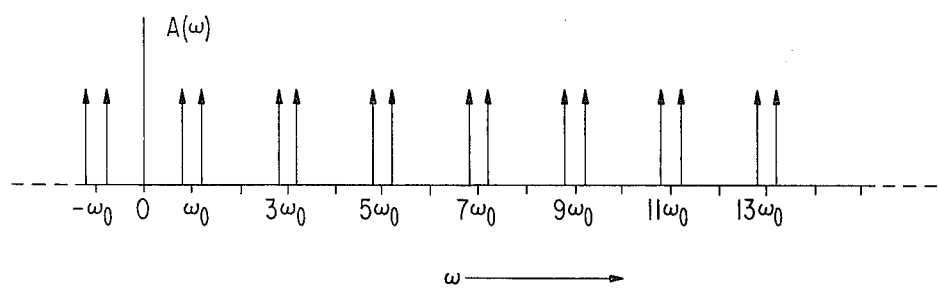
FIG. 1 illustrates a frequency spectrum of an ideally sampled multifrequency signal having an even number of tones useful in describing the invention.

As indicated above, it has heretofore been the practice to sample stored representations of amplitude samples at as high a sampling rate as possible, in order to generate harmonic frequency components as far away from the desired signals as is practical. However, in accordance with an aspect of the instant invention, the so-called "alias" signal that results from sampling is turned to account to generate desired multifrequency signals. This is realized by outputting stored amplitude values, i.e., or read-out at a sampling rate which is less than the Nyquist rate of the highest frequency tone in the desired multifrequency signal, where the Nyquist rate is twice the frequency of the highest frequency tone.

Briefly, for a multifrequency signal having an even number of tones, an expression for the tones lower than the average frequency ($\omega_0$) of all the tones is $$B(\omega) = \pi \sum_{k=1}^{M} [\delta[\omega + (\omega_0 - \omega DIFF(k))] + \delta[\omega - (\omega_0 - \omega DIFF(k))]] \quad (1)$$

where $B(\omega)$ is the spectrum of the signal components below $\omega_0$, $\omega_0$ is the average frequency ($2\pi f_0$) of all the tones in the multifrequency signal, M is the number of tones, $\omega DIFF(k)$ is $\omega_0 - 2\pi f(k)$ and $f(k)$ is the $k^{th}$ frequency component below $\omega_0$.

We know that a periodic train of impulses C(t) with period T is $$C(t) = \sum_{k=-\infty}^{\infty} \delta(t - kT) \quad (2)$$

and the Fourier transform of C(t) is $$F\{C(t)\} = \frac{2\pi}{T} \sum_{n=-\infty}^{\infty} \delta\left(\omega - n\frac{2\pi}{T}\right) \quad (3)$$

If we let $T = (\pi/\omega_0)$ the transform of the impulse train is $$F\{C(t)\} = 2\omega_0 \sum_{n=-\infty}^{\infty} \delta(\omega - 2n\omega_0). \quad (4)$$

Thus, if $B(\omega)$ is sampled with $F\{C(t)\}$ at a sampling rate which is twice the average frequency, i.e., $2f_0 = (\omega_0/\pi)$, the transform of the result is $$A(\omega) = B(\omega) * F\{C(t)\} = \quad (5)$$

-continued $$2\pi \sum_{n=-\infty}^{\infty} \sum_{k=1}^{M} [\delta[\omega - (2n-1)\omega_0 - \omega DIFF(k)] + \delta[\omega - (2n-1)\omega_0 + \omega DIFF(k)]].$$

The spectrum of a signal having two tones is shown in FIG. 1. It is clear that the spectrum shown in FIG. 1 consists of pairs of frequency components, separated from each other by $2\omega DIFF$ and each pair of centered around odd multiples of $\omega_0$. The above spectrum would also result from sampling the tones having frequencies greater than $\omega_0$ or a composite of all the tones.

FIG. 1 shows the result obtained by ideal sampling with a train of impulses at a rate of twice the average frequency $f_0$ which is less than the theoretical Nyquist rate, i.e., twice the frequency of the highest frequency component in the multifrequency signal being generated.

In practice, however, flat-topped sampling is employed.

We can derive flat-topped sampling by considering the ideally sample signal to be passed through an idealized filter which stretches out impulses into flat-topped pulses. The impulse response of this filter is a pulse of duration $\tau$. The transfer function of this filter is known to be $$H(\omega) = \tau \frac{\sin\left(\frac{\omega\tau}{2}\right)}{\frac{\omega\tau}{2}}. \quad (6)$$

Thus, to get the spectrum of our flat-topped sampled signal, we multiply $$S(\omega) = A(\omega) \cdot H(\omega) \quad (7)$$

If we choose sampling interval $\tau$ to be $(2\pi/3\omega_0)$ we find that $H(\omega)$ equals zero when $$\omega = 3n\omega_0, \ n = 1,2,3,\ldots \quad (8)$$

Figure 2:
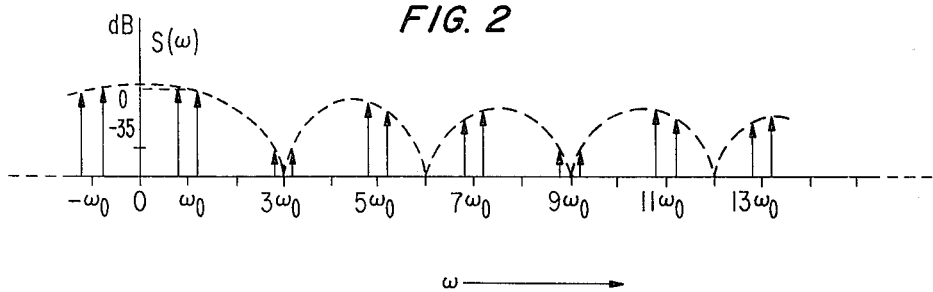
FIG. 2 illustrates a resulting frequency spectrum of a so-called flat-topped sampled version of the signal of FIG. 1 also useful in describing the invention.

This means that the spectrum of our flat-topped sampled signal has nulls every third multiple of $\omega_0$. Any components lying near these nulls are attenuated. The resulting spectrum $S(\omega)$ is shown in FIG. 2 for a signal having two tones.

In many applications, the first undesired frequency component is associated with the third multiple of $\omega_0$, i.e., $3\omega_0$. Since $3\omega_0$ is substantially at the first null resulting by the selection of sampling interval $\tau$ to be $1/(3f_0)$, from experimental practice the $3\omega_0$ signal component is approximately 35 dB below $\omega_0$ without filtering for a given example of generating a signal including tones at 440 Hz and 480 Hz. Therefore, the first undesired frequency component to be filtered is $5\omega_0$ which is far enough away in frequency from $\omega_0$ that it and higher order frequency components are easily filtered.

Figure 3:
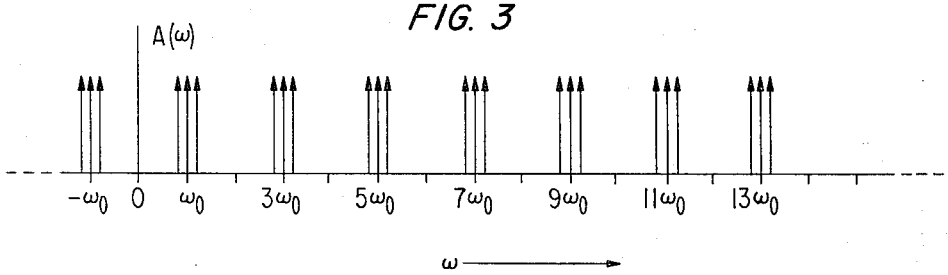
FIG. 3 illustrates a frequency spectrum of a multifrequency signal having an odd number of tones.
Figure 4:
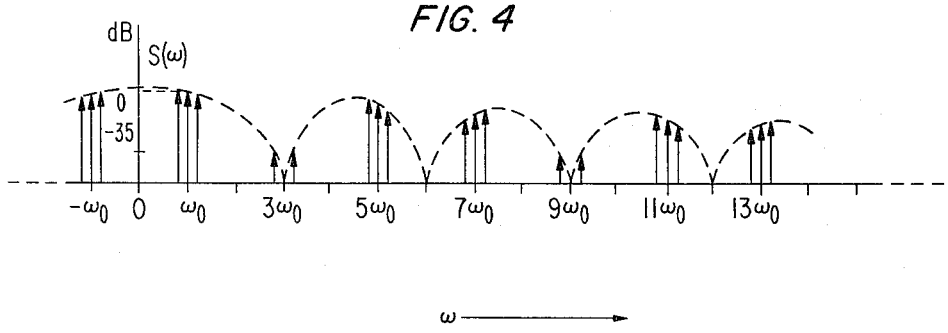
FIG. 4 illustrates the frequency spectrum of a flat-topped sampled version of the signal of FIG. 3.

For signals having an odd number of tones the expression for the resulting spectrum is essentially identical to Equation 5 except that $k=0$ to M rather than 1 to M. The spectrum of a signal having three tones is shown in FIG. 3 and the resulting spectrum obtained via flat-topped samples with sampling interval $\tau = 1/(3f_0)$ is shown in FIG. 4.

In a specific example, it is desired to generate a multifrequency signal having two tones which is employed to generate a ringback tone for telephone signaling. To this end, a signal having a 440 Hz tone and a 480 Hz is generated. As indicated above, the desired signal may be generated by sampling digital representations of the 440 Hz tone, the 480 Hz tone, or the composite of both tones. The sum of the 440 Hz and 480 Hz tones is equivalent to a 460 Hz carrier signal amplitude modulated by a 20 Hz signal, with the period of the resultant signal being one-half the period of the 20 Hz signal. Enough amplitude samples need be stored to generate one period of the composite signal. Thus, in this example, 920/40 or only 23 amplitude samples are required. As indicated, if a higher sampling rate were employed, more amplitude samples would be needed and, hence, more memory would be required. The amplitude sample values are computed in well-known fashion and stored in a read only memory as described below.

Thus, it is seen that by selecting sampling rate Fs which is twice average frequency $F_0$ of the tones of the multifrequency signal and utilizing the usually unwanted "alias" frequency components which are generated, a desired multifrequency signal is obtained. Additionally, it is seen that the frequency spacing between the tones, see for example FIG. 1, may be decreased without a corresponding increase in the computer speed because of the use of the alias components. Specifically, when sampling either the 440 Hz tone or 480 Hz tone, the other would be the alias component.

Figure 5:
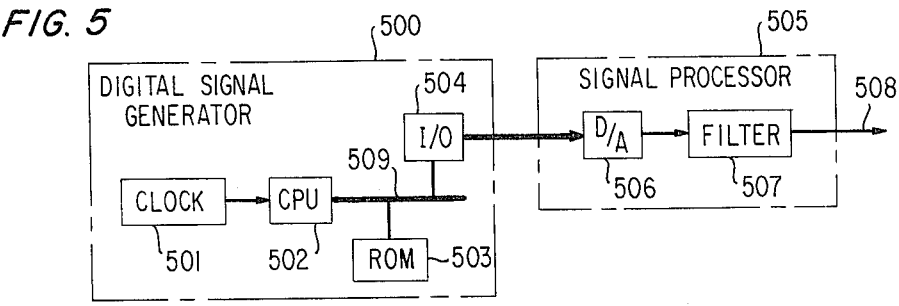
FIG. 5 shows in simplified block diagram form apparatus for practicing the invention.

FIG. 5 shows in simplified block diagram form an arrangement employing one embodiment of the invention for advantageously generating multifrequency signals. Accordingly, shown are digital signal generator 500 and signal processor 505. Digital signal generator 500 may include any of numerous arrangements known in the art for generating digital signals representative of desired analog signals. Preferably, digital signal generator 500 includes clock 501, central processor unit (CPU) 502, read only memory (ROM) 503 and input/output (I/O) unit 504. Clock 501 provides timing signals for CPU 502 in well-known fashion. CPU 502, ROM 503 and I/O 504 are interconnected via bus 509 to form a microcomputer system. Any of the known microcomputer arrangements may be equally employed to practice the invention. Specifically, a so-called MAC-4 microcomputer manufactured by Western Electric Company is utilized for this purpose. The MAC-4 is a 4-bit microcomputer arrangement and is programmed utilizing the "C" programming language. Indeed, an Intel 8748 microcomputer is one example of another arrangement which may equally be used to practice the invention.

Digital signal representations of appropriate amplitude values of the multifrequency signal to be generated and a program to be described below for controlling sampling of the digital signals are stored in ROM 503. The digital signals representing amplitude values are supplied under control of CPU 502 via I/O 504 to signal processor 505.

Signal processor 505 includes digital-to-analog (D/A) converter 506 and low-pass filter 507. Digital signals from digital signal generator 500 are converted to desired "clean" analog forms via D/A 506 and filter 507 in well-known fashion. A multifrequency signal is developed at output 508 for use as desired, in this example, to generate ringback tone.

Figure 6:
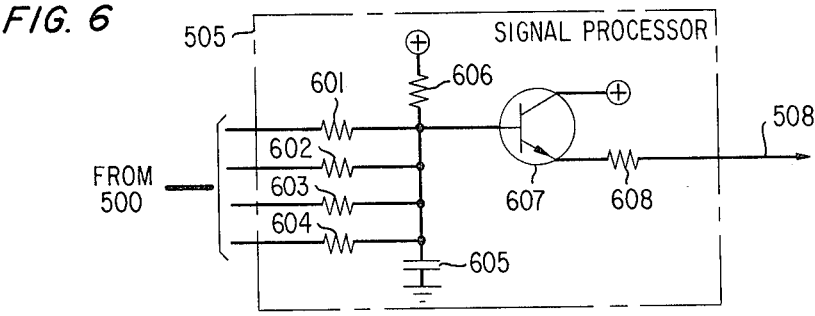
FIG. 6 depicts details of a signal processor used in the apparatus of FIG. 5.

FIG. 6 shows details of one arrangement which may be advantageously employed for signal processor 505 to obtain the desired analog multifrequency signal of this example. Since the MAC-4 microcomputer system employs 4-bit digital words only four amplitude scaling resistors are required, namely, resistors 601, 602, 603 and 604. The resistance values of resistors 601–604 are selected to obtain desired amplitude values in response to digital amplitude representations supplied via I/O 504 from digital signal generator 500. Resistors 601–604 each have one terminal connected to I/O 504 and another terminal connected to a circuit point connecting one terminal of resistor 606, one terminal of capacitor 605, and a base terminal of NPN transistor 607. Another terminal of resistor 606 is connected to potential (+) and another terminal of capacitor 605 is connected to a reference potential point, namely, ground potential. A collector terminal of transistor 607 is connected to potential (+) while an emitter terminal is connected via limiting resistor 608 to output 508. Transistor 607 is employed as a buffer amplifier. Resistor 601–604 and 606 in conjunction with capacitor 605 form D/A 506 and filter 507. Thus, the circuit of FIG. 6 operates as a combined D/A and low-pass filter. As will be apparent to those skilled in the art, a desired conversion function and filter characteristic are obtained by appropriate selection of component values. Moreover, it is seen that an extremely simple D/A and filter arrangement is only employed to obtain a desired "clean" multifrequency signal. Again, this is realized by employing applicant's unique technique utilizing a sampling rate, namely, $2f_0$, which is less than the theoretical Nyquist rate for the highest frequency of the multifrequency signal being generated and a sampling interval which is uniquely related to the sampling rate, namely, $\tau = (1/3f_0)$.

Operation of digital signal generator 500 to effect generation of desired multifrequency signals, in accordance with aspects of the invention, for one example, is described in the digital program shown in the Appendix. This program listing, written in assembly language for the MAC-4 microcomputer system, is a description of the set of electrical control signals that serve to configure digital signal generator 500 into a machine capable of generating digital signals representative of the desired multifrequency signals which when processed via signal processor 505 yield desired analog multifrequency signals.

Figure 7:
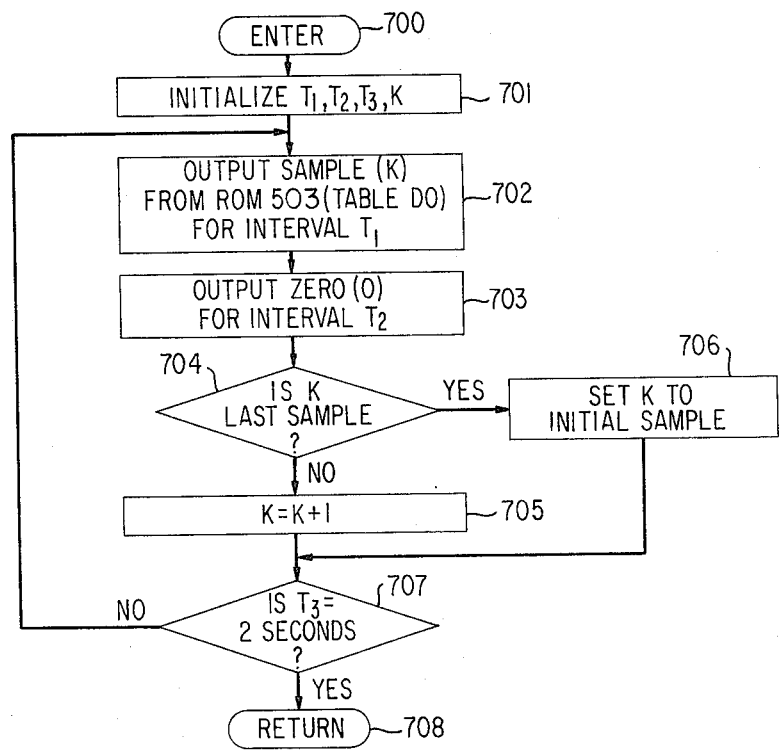
FIG. 7 shows a flowchart illustrating steps employed in one embodiment of the invention for generating a desired multifrequency signal.

The program listing and, hence, operation of digital signal generator 500, in accordance with aspects of the invention, is more readily understood with the aid of the flowchart shown in FIG. 7. The flowchart can be seen to include three different symbols, the oval symbols indicate entering and exiting the program routine, the rectangular symbols, commonly referred to as operational blocks, contain the description of a particular detailed operational step to be performed, and the diamond symbols, commonly referred to as conditional branch points, contain a description of a test performed by the microcomputer for enabling it to determine the next operational step to be performed.

As shown in the flowchart of FIG. 7, the digital signal generation routine is entered at oval 700.

Operational block 701 causes time intervals $T_1$, $T_2$ and $T_3$ to be initialized to predetermined values dependent on the tone frequencies in the multifrequency signal to be generated and the interval that the signal is to be generated for. K is a table index of samples to be outputted for generating the desired tones and is set to the first sample in, for example, a table stored in ROM 503. In an example for generating a multifrequency signal including tones at 440 Hz and 480 Hz, $T_1$ is sample interval $\tau$ which equals $1/(3f_0)$. Since in this example $f_0=460$ Hz, $T_1=725$ microseconds, $T_2$ is equal to the period of the sample rate, i.e., $1/f_S$ where $f_s=2f_0$, less the sampling interval $T_1$. Thus, $T_2=1/(2f_0)-1/(3f_0)$ or 362 microseconds. Since the multifrequency signal in this example is employed to generate a ringback tone, it is generated for the standard interval $T_3=2$ seconds. Thereafter, control is transferred to operational block 702.

Operational block 702 causes CPU 502 to output via bus 509 and I/O 504 a sample at index K of the table in ROM 503 for interval $T_1$. As indicated above, sample interval $T_1$, in accordance with an aspect of the invention, is selected to substantially minimize undesirable harmonic frequency components in the output from processor 505. In this example, $T_1=1/3f_0$ seconds. Thereafter, control is transferred to opeational block 703.

Operational block 703 causes CPU 502 to output a digital representation of zero amplitude for interval $T_2$, in this example $$T_2 = \left( \frac{1}{2f_0} - \frac{1}{3f_0} \right)$$

seconds. Thus, operational blocks 702 and 703 effect outputting sample K for interval $T_1$ at the desired sampling rate of $f_S=2f_0$. Thereafter, control is transferred to conditional branch point 704.

Conditional branch point 704 performs a test to determine if K is the index of the last sample in the table in ROM 503. If the test result is YES, control is transferred to operational block 706 and K is reset to the index of the first sample in the table in ROM 503. Then, control is transferred to conditional branch point 707. If the test result is NO, control is transferred to operational block 705 and K is incremented to the next index in the table, i.e., $K=K+1$. Thereafter, control is tranferred to conditional branch point 707.

Conditional branch point 707 performs a test to determine if the multifrequency signal has been generated for interval $T_3$, in this example, 2 seconds. If the test result is NO, control is transferred to operational block 702 and steps 702 through 706 are iterated until a YES result is obtained. Upon obtaining a YES result in conditional branch point 707, control is transferred to oval 708 and control is returned to a main routine or the routine is ended.

APPENDIX

```
                ringback( )
                {
                /* Generates ringback tones. Returns to
                main routine if ring is tripped, or far
                end on hook, or after two seconds.
                The operations on the dummy variables,
                dumnib and dumbyte are done to adjust
                timing. */
                byte periodcount ;
                byte triptime ;
                extern addr delaytime ;
                nib dumnib ;
                byte dumbyte ;
4E7 7 6 9 4     nib table[ ]    {7, 6, 9, 4}
4EB B 3 c 1                     {11, 3, 12, 1}
4EF D 0 E 0                     {13, 0, 14, 0}
4F3 E 0 E 1                     {14, 0, 14, 1}
```

APPENDIX-continued

```
4F7 D 2 B 3                     {13, 2, 11, 3}
4FB A 5 8 0                     {10, 5, 8, 0} ;
                                /* Last zero used just for testing */
400 3 7 0 3 5 0                 xr = {nib, *p0++} ;
406 3 7 2 1 4                   hp0 = 4 ;
40B F 2                         periodcount = 80 ;
40D 3 7 2 C 0 5
                                do
413 F 2                         {
415 3 7 4 C A 0                 triptime = 10 ; /*ten ms */
41B 3 7 0 1 7 E                 SAMPLENUM = &table ;
                                loop:
                                {
421 3 6 8 2                     DACOUT = *SAMPLENUM++ ;
425 7 2 1 4 3                   if (RINGTRIP ) --triptime ;
42A F 2
42C D 4 2 4 C
431 C C 3                       else dumbyte = dumbyte ;
434 F 2
436 3 5 7 C 7 C
                                if (triptime == 0) goto end ;
43C F 2
43E 5 4 4 C 8 A
444 E 4 B E 3                   look_far_end( ) ;
                                if (FE_ON_HOOK) goto end ;
449 6 6 9 B 8 A
44F F 3                         delaytime = UP_TIME ;
451 3 7 6 B 0 0 0
458 E C B B 3                   delay( ) ;
45D D 7 F 0 6 C 0               bit (0,dumnib) = bit(0,0) ;
464 F 2                         dumbyte = dumbyte ;
466 3 5 7 C 7 C
46C 3 7 8 2 7                   DACOUT = ZEROLEVEL ;
                                if (SAMPLENUM ! =
                                LASTSAMPLE + 1 )
471 1 7 0 1 E F 2 9             {
479 F 3                         delaytime = DOWN_TIME ;
47B 3 7 6 B 0 0 0
482 E C B B 3                   delay( ) ;
487 F 1                         xro = 1 ;
489 D 7 8 6 C 0                 dumnib =+ 0 ;
48F C 1 2                       goto loop ;
                                }
                                }
492 D 7 F 0 6 C 0               bit (0,dumnib) = bit (0,0) ;
499 F 2                         --periodcount ;
49B D 4 2 2 C
                                }
4A0 F 2                         while (periodcount ! = 0 ) ;
4A2 4 4 2 C 3 1
4A8 3 7 8 2 7                   end: DACOUT = ZEROLEVEL ;
4AD F 2                         if (triptime == 0) { SEND_LC ;}
4AF 4 4 4 C 1 C
4B5 D 0 F 0 B A
4BB D 0 F 4 B A
4C1 3 7 0 3 1 0                 xr = {nib} ;
4C7 E 0 F                       }
```

I claim:

1. Apparatus for generating a multifrequency signal having a plurality of tones comprising
   means for outputting digital signal representations of the amplitude values of at least one of said tones at a predetermined rate; and being characterized by
   means for controlling said predetermined rate to be less than the Nyquist rate of the tone having the highest frequency in said multifrequency signal.

2. Apparatus as defined in claim 1 wherein said predetermined rate is selected in a predetermined relationship to the average frequency of all the tones in the multifrequency signal.

3. Apparatus as defined in claim 2 wherein said predetermined rate is twice said average frequency.

4. Apparatus as defined in claim 1 wherein said outputting means includes means for reading out each of said digital representations for a predetermined interval selected to substantially minimize components at predetermined frequencies in the spectrum of the resulting multifrequency signal.

5. Apparatus as defined in claim 4 wherein said predetermined interval is selected in a predetermined relationship to an average of all the frequencies of the tones in the multifrequency signal.

6. Apparatus as defined in claim 5 wherein said predetermined interval is selected to substantially minimize at least third harmonic frequency components of said average frequency.

7. Apparatus as defined in claim 6 wherein said predetermined interval is selected to be an interval equal to the reciprocal of three times said average frequency.

* * * * *